Patented Aug. 9, 1938

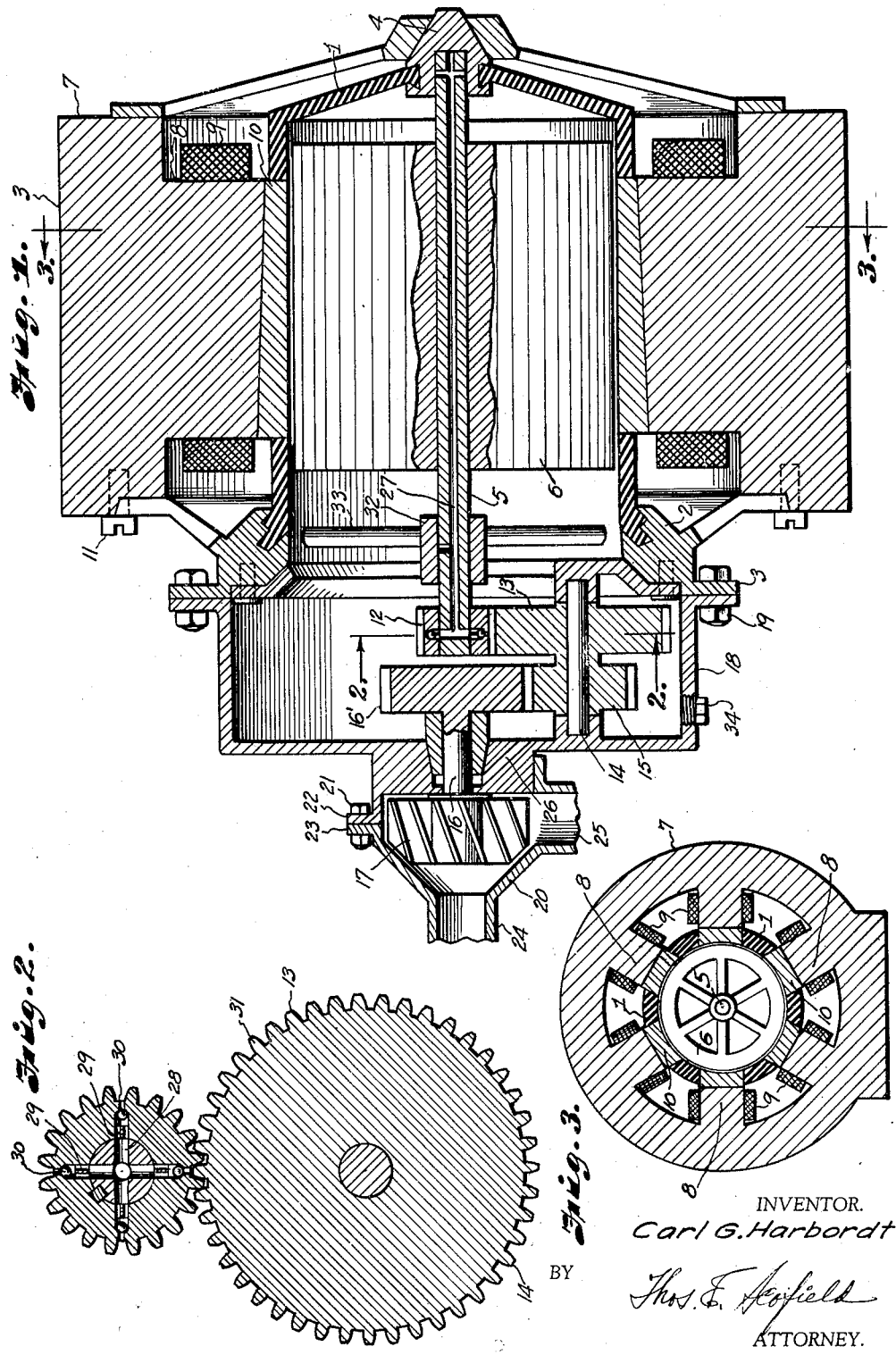

2,126,385

UNITED STATES PATENT OFFICE 2,126,385

PUMPING ASSEMBLY

Carl G. Harbordt, Kansas City, Mo.

Original application July 3, 1933, Serial No. 678,788. Divided and this application July 10, 1936, Serial No. 89,889

1 Claim. (Cl. 230—117)

My invention relates to pumping assemblies and more particularly to an electric motor and pump combination in which the pump is glandless.

This application is a divisional application of my copending application, Serial No. 678,788, filed July 3, 1933.

In pumping assemblies for mechanical refrigerators, it is essential that the refrigerant fluid or the like, being circulated, does not leak into the space being refrigerated because it is used for the storage of food. Most glands will leak in time, releasing the fluid.

One object of my invention is to provide a glandless pump and motor assembly.

Another object of my invention is to provide a pumping system in which the motor and pump are hermetically sealed.

Other and further objects of my invention will appear from the following description.

In the accompanying drawing which forms part of the instant specification and is to be read in conjunction therewith and in which like reference numerals are used to indicate like parts in the various views;

Figure 1 is a diagrammatic sectional elevation of one form of pumping and motor assembly embodying my invention.

Figure 2 is a sectional view taken on the line 2—2 of Figure 1.

Figure 3 is a sectional view taken on the line 3—3 of Figure 1.

In general, my invention contemplates enclosing the rotor of an induction motor within a hermetically sealed casing through which the pole pieces project. The rotor is connected in any suitable manner for driving a pump of any suitable design, also enclosed in a casing, the construction being such that no gland need be used.

Referring now to the drawing, a casing 1, made of any suitable, non-metallic material, as for example, a phenol condensation product, is suitably joined to a ring 2, carrying a flange 3. A suitable inset 4 is provided in the casing 1 to act as a bearing for the shaft 5 of the electric motor. The rotor 6 of the motor is secured to shaft 5. The stator of the motor is provided with pole pieces 8 around which the windings 9 are placed. The pole pieces 8 are adapted to fit upon pole piece extensions 10 which are merged into and form part of the casing 1. It is necessary that the pole piece extensions 10 extend through the casing in order that the magnetic gap between the poles and the rotor be made as small as possible to enable efficient performance. The stator is held in removable position by means of screws 11, as can readily be seen by reference to Figure 1. Secured to shaft 5 is a gear 12 forming part of the reduction gearing. Gear 12 meshes with gear 13 secured to shaft 14 which carries a gear 15 for rotation therewith, in turn meshing with a gear 16′ which drives a shaft 16 to which the pump impeller 17 is secured.

The gearing just described is housed within housing 18 which is secured to flange 3 by bolts 19. Pump housing 20 is secured to the housing 18 by means of bolts 21 passing through flanges 22 and 23. The pump is adapted to take suction from conduit 24 and discharge to conduit 25. When fluid leaks by the point where shaft 16 passes out of the housing 18, it is adapted to pass within the housing 18 through a duct 26.

Housing 18 has direct communication with casing 1. The shaft 5 is provided with an outlet 27 which terminates in a number of branch ducts 28 communicating with similar ducts 29 formed in the gear 15. Each of the ducts 29 is closed by ball check valve 30. Oil is adapted to be placed within the housing 18 so that the enmeshing teeth 31 of gear 13 are adapted to act as a pump for pumping oil through duct 27 of shaft 5 for oiling the bearing 4 and the bearing 32 supported by spider arms 33. The oiling system disclosed is merely one adaptation which may be employed. The housing 18 is fitted with a drain plug 34.

It will be seen that I have accomplished the objects of my invention. I have provided a glandless pump and motor assembly in which the rotor of the motor is completely enclosed in a hermetically sealed housing in which housing the impeller of the pump is in effect sealed. By providing pole piece extensions integral with the housing surrounding the rotor, I avoid the magnetic loss which will otherwise render the motor so inefficient that it could not be economically used.

It will be understood that certain features and sub-combinations are of utility and may be employed without reference to other features and sub-combinations. It is further obvious that various changes may be made in details within the scope of my claim without departing from the spirit of my invention. It is, therefore, to be understood that my invention is not to be limited to the specific details shown and described.

Having thus described my invention, what I claim is:

A pump and motor assembly comprising in combination a sealed housing of non-magnetic material, magnetic inserts forming portions of the walls of said housing and extending therethrough, a rotor of an electric motor positioned within said housing, a fluid pump, means for operatively connecting said rotor with said pump for driving the same, a stator having pole pieces, said magnetic inserts having their outer portions inclined with respect to the axis of said rotor, said pole pieces having surfaces oppositely inclined to the inclinations of said magnetic inserts and assembled in superimposed relationship with said magnetic inserts whereby said magnetic inserts form extensions of said pole pieces, the construction being such that the stator construction may be easily removed and leakage of fluid being pumped will be into said sealed housing.

CARL G. HARBORDT.